106. COMPOSITIONS, COATING OR PLASTIC.

93

*[handwritten annotations: 100 pts. — Cement / 1 to 3 pts — asbestos / 2 to 3 pts — Cellulose fibers which have been treated with a cold solution of NaOH or KOH]*

*[handwritten: Examiner]*

UNITED STATES PATENT OFFICE.

MAURICY IGNACY POZNANSKI, OF GENEVA, SWITZERLAND.

PROCESS AND COMPOSITION FOR THE MANUFACTURE OF ARTIFICIAL-STONE SLABS.

1,234,692.     Specification of Letters Patent.     Patented July 24, 1917.

No Drawing.     Application filed March 11, 1916. Serial No. 83,552.

*To all whom it may concern:*

Be it known that I, MAURICY IGNACY POZNANSKI, manufacturer, a subject of the Emperor of Russia, residing at Geneva, Canton of Geneva, in the Confederation of Switzerland, have invented certain new and useful Improvements in Processes and Compositions for the Manufacture of Artificial-Stone Slabs, of which the following is a specification.

This invention relates to improvements in processes and compositions for the manufacture of artificial stone from cement that sets or hardens (sometimes called hydraulic mortar, of which ordinary Portland cement is an example) and fibrous material, and particularly to improvements in processes and compositions of the kind just mentioned in which use is made of fibrous vegetable matter as a substitute for asbestos, which is comparatively costly.

In the manufacture of artificial stone slabs there has been employed a process in which for instance cement and asbestos fibers are treated in a rag-engine or other mixing-machine with a great amount of water, after which the resulting paste is worked in suitable engines into the form of slabs. Or dry cement and asbestos are mixed together and the mixture is treated with water and molded into slabs. A third process comprises making the slab in a paper-engine and the cores of the slabs are made of the asbestos fibers taken from a rag-engine, over which cores dry cement powder is spread. A satisfactory result can be obtained with only the first of the three processes above referred to, but owing to the high price of asbestos it has been often tried to manufacture artificial stone slabs without the use of asbestos or with a mixture of asbestos and other fibers. These attempts however have hitherto not succeeded.

The asbestos in artificial stone slabs has two different functions: the first consists in its very great affinity for cement, owing to which one or two grams of asbestos suffice to combine with one hundred grams of the cement particles which are present in the water, even if there is a great excess of water. This does not occur in the case of vegetable fibers, where even a very small excess of water suffices to remove the particles of cement from the fibers, which have no affinity for the cement. Animal fibers cannot be used as they are destroyed by free lime. It results therefrom that, when vegetable fibers are used, the sieve, on which the paste is treated, lets through not only the water but also the detached cement particles, which are therefore lost.

The second function of the asbestos consists in giving a sufficient strength to the slabs during the manufacturing process in order to allow them to be manipulated without tearing. This second function involves the employment of 10 to 15 parts by weight of asbestos to 100 parts by weight of cement.

The first of these two functions of the asbestos can be accomplished by only the asbestos itself, while the second function may be performed by a vegetable fiber.

In this direction also there have been made numerous experiments, which however have not succeeded for the reason that most vegetable fibers are disaggregated by the action of the cement water and prevent the hardening of the cement.

Experiments have been made in order to find the cause of the destruction of the vegetable fibers by the cement water. These experiments show that this cause is the same as if the vegetable fibers were treated with cold alkalis, such as a cold solution of caustic soda or potash. By such treatment the vegetable fibers are partially dissolved and partially shrunk up. As the cement water is also strongly alkaline and is employed in a cold state, experiments were made to determine whether cement water has also an analogous effect upon vegetable fibers and it has been found that cotton immersed in cold cement-water really does shrink up. This is the reason why cement does not harden with vegetable fibers.

One can remove this drawback by impregnating the vegetable fibers with tarry or other matters before they are brought into contact with the cement, but the impregnation has another drawback consisting in the fact that the impregnated fibers agglutinate and conglomerate so that they are no longer able to produce the desired effect. Moreover the effect of such an impregnation is more or less removed during the treatment of the fibers in the rag-engine and other mixing machine.

Attempts were thereafter made to treat vegetable fibers with cold strong solutions of caustic soda or potash, in order to cause in these fibers on the one hand the greatest possible shrinking up and on the other hand the greatest possible dissolving of the particles which are soluble in cold alkalis. It was thought that cold cement water would have no action upon vegetable fibers which had previously been treated in such a manner, as it is much less alkaline than the solution of caustic soda or potash employed for the treatment of the fibers. These suppositions proved to be correct and the hardening of cement which is brought into contact with vegetable fibers treated with a cold solution of caustic soda or potash, is not prevented and is perfect, so that a great part of the expensive asbestos fibers may, in the manufacture of artificial stone slabs, be easily replaced by vegetable fibers, such as for instance sulfite wood pulp (cellulose) or cotton which has been previously treated with a cold solution of caustic soda or potash.

The following proportions can for instance be mixed together in order to form a mass which may be employed for the manufacture of artificial stone slabs:

100 parts by weight of cement.
300 to 600 parts by weight of water.
1 to 3 parts by weight of asbestos.
2 to 3 parts by weight of cotton fibers or sulfite wood pulp (cellulose) which have been treated previously by a cold solution of caustic soda or potash.

This mass is formed into plates of any desirable size.

The hereinbefore described process produces therefore artificial stone slabs in a much cheaper manner than the hitherto known processes, in which for 100 parts by weight of cement, 10 to 12 parts by weight of asbestos are required.

Herein the term, cement, is not intended broadly to mean or include binding material of any kind (such as glue, rubber, gutta percha and the like) but is used in the ordinary, common acceptation of the term among builders and dealers in building materials to denote material of the nature of hydraulic mortar, of which Portland cement is one kind or example.

Having now fully described the nature of my invention, I declare that what I claim is:—

1. A composition for making artificial stone, consisting of cement, asbestos and vegetable fibers which have been preliminarily treated with a cold alkaline solution.

2. A subprocess in the process for making artificial stone, comprising preliminarily treating fibrous vegetable matter with a cold alkaline solution; and then mixing the treated fibrous vegetable matter with cement water.

In testimony whereof I have affixed my signature in presence of two witnesses.

MAURICY IGNACY POZNANSKI.

Witnesses:
DAVID MICHEL FENHL,
ROD. D. WEMTEMBURG.

Copies of this patent may be obtained for five cents each, by addressing the "Commissioner of Patents, Washington, D. C."